Patented Oct. 11, 1949

2,484,706

UNITED STATES PATENT OFFICE 2,484,706

ACYLATION OF DICHLOROTHIOPHENE

Howard D. Hartough, Pitman, N. J., and Alvin I. Kosak, Columbus, Ohio, assignors to Socony-Vacuum Oil Company, Incorporated, a corporation of New York No Drawing. Application December 17, 1946, Serial No. 716,876

7 Claims. (Cl. 260—329)

This invention relates to a process for converting a dichlorothiophene into an acylated monochlorothiophene. More particularly, the invention is concerned with a method for catalytically acylating a mixture of mono- and dichlorothiophene to yield a single acylation product, namely, 2-acyl-5-chlorothiophene.

In the course of chlorinating thiophene, the usual reaction product is a mixture of 2-chlorothiophene and 2,5-dichlorothiophene, the relative amounts of each depending on the particular conditions under which the chlorination is carried out. In preparing derivatives of mono- or dichlorothiophene, it has heretofore been found necessary to separate the thiophene chlorination mixture into its components in order that one or both of the chlorothiophenes could be treated further to effect preparation of the particular derivative concerned without accompanying contamination by the corresponding derivative of the remaining undesired chlorothiophene.

Thus, the method commonly employed in the preparation of acyl derivatives of the chlorothiophenes is by reacting a chlorothiophene and an acylating agent in the presence of a Friedel-Crafts type catalyst, such as aluminum chloride. In such instances it has been found necessary to separate the thiophene chlorination mixture into its components prior to acylation in order to avoid obtaining a mixture of 2-acyl-5-chlorothiophene resulting from acylation of the monochlorothiophene and 3-acyl-2,5-dichlorothiophene resulting from acylation of the dichlorothiophene present in the mixture. Thus, with the use of a catalyst, such as aluminum chloride, it has been found that upon acylation of a 2,5-dichlorothiophene, the entering acyl group will attach itself to the 3-position of the thiophene ring to yield a 3-acyl, 2,5-dichlorothiophene. This product is hence obtained in admixture with the acylation product of 2-chlorothiophene, namely, 2-acyl-5-chlorothiophene, when the mixture being subjected to acylation is a composite of mono- and dichlorothiophenes. To obtain a relatively pure 2-acyl-5-chlorothiophene it has heretofore accordingly been necessary to separate the thiophene chlorination mixture into its components before undertaking the acylation reaction.

In accordance with the present invention it has now been discovered that in preparing acylated monochlorothiophene, prior separation of the chlorination mixture can be dispensed with and the composite of mono- and dichlorothiophene can be acylated directly to give a single acylation product. It has been found by carrying out the acylation reaction in the presence of phosphoric acid as a catalyst that 2,5-dichlorothiophene or admixture of the same with 2-chlorothiophene can be acylated directly to yield a 2-acyl-5-chlorothiophene.

It is, accordingly, an object of this invention to provide an efficient process for synthesizing acyl derivatives of monochlorothiophene by acylating a dichlorothiophene or the thiophene chlorination mixture of dichloro- and monochlorothiophene. A further object is the provision of a catalytic method for preparing a 2-acyl-5-chlorothiophene from a 2,5-dichlorothiophene. A very important object is the provision of a process whereby a mixture of mono- and dichlorothiophenes can be acylated to yield a single acylation product, namely, a 2-acyl-5-chlorothiophene.

These and other objects which will be recognized by those skilled in the art are attained in accordance with the present invention wherein dichlorothiophene or admixtures of the same with monochlorothiophene are acylated by reaction with an acylating agent in the presence of phosphoric acid as a catalyst.

The acylating agents to be used herein may be any of the commonly employed carboxylic acid anhydrides or acyl halides. These may be derived by methods well known to the art from organic acids which may be either unsaturated or saturated. Thus, representative acylating agents to be used in the method of this invention include the anhydrides of saturated fatty acids, such as acetic anhydride, proprionic anhydride, ketene, etc.; the acyl halides of saturated fatty acids, such as acetyl chloride, etc.; the anhydrides of unsaturated acids, such as crotonic anhydride; the acyl halides of unsaturated acids, such as crotonyl chloride; the anhydrides of dibasic acids, such as adipic anhydride; the acyl halides of dibasic acids, such as aidpyl chloride; and the anhydrides of aromatic acids, such as benzoic anhydride. These acylating agents are not to be considered as limiting, since other acyl halides or anhydrides of carboxylic acids which will readily suggest themselves to those skilled in the art may likewise be used.

The phosphoric acid catalyst may be employed in amounts as little as 0.1 per cent by weight of the reactants. However, amounts between about 1 and about 8 per cent by weight are preferable. The catalyst will generally be added to the mixture of reactants in substantially pure form or as a highly concentrated aqueous solution. For example, a concentration of about 85 per cent phosphoric acid has been found to be a particularly effective catalyst for use in the process of this invention. The use of more dilute solutions, in general, requires a greater addition of acid. The concentration and volume of acid employed, however, should preferably be such that the acid is present in the reaction mixture in amounts of from about 1 to about 8 per cent by weight of the reactants.

The process may be carried out employing equimolar quantities of dichlorothiophene or of the thiophene chlorination mixture and acylating agent. However, an excess of one of the reactants appears to be desirable, resulting in an increased yield of product. The reaction rate is largely a function of the temperature, increasing with increasing temperature, the upper limit of temperature being dependent on the boiling point of the reactants at the specific pressure of the reaction. In general, temperatures between about $-30°$ C. and about 150° C. and pressures between about 1 and about 10 atmospheres have been found satisfactory for effecting the acylation reaction. Ordinarily, a pressure sufficient to maintain the reactants in the liquid phase is used and this is more or less dependent on the particular temperature involved. As a general rule, the higher the temperature, the greater the pressure and the lower the reaction time needed. It is, of course, to be understood that these reaction variables are more or less interdependent. Generally, however, the reaction period required for the acylation process to be complete will be between about 1 and about 10 hours.

The acylated chlorothiophenes produced in accordance with this invention are useful in preparation of insecticides, as solvents, dye intermediates, addition compounds for petroleum fractions, plasticizers, odorants, perfume diluents, resin intermediates and intermediates for chemical synthesis.

The following examples will serve to illustrate the process of this invention without limiting the same:

*Example 1*

To a mixture of 355.5 grams (3 moles) of 2-chlorothiophene and 377 grams (3.5 moles) of 95 per cent acetic anhydride were added 35 grams of 85 per cent orthophosphoric acid. The mixture was heated at 130–135° C. for three hours. After cooling, 500 millimeters of water were added and the mixture was distilled until all of the 2-chlorothiophene present in the reaction product mixture was recovered. The mixture was diluted with benzene, washed to remove acetic acid present and finally washed with dilute sodium carbonate solution until neutral. After removal of the benzene, the product was distilled under reduced pressure to yield 337 grams (70 per cent yield) of 2-acetyl-5-chlorothiophene having a boiling point at 4 millimeters pressure of 88° C. The product was recrystallized from alcohol and water to give a pure white product having a melting point of 46.5–47° C. A mixed melting point of this product with an authentic sample of 2-acetyl-5-chlorothiophene showed no depression. The oxime of the product was prepared by standard procedures and after recrystallization from alcohol and water it melted at 159.5–160.5° C. Analysis of the oxime indicated a nitrogen content of 7.84 per cent which is identical with the calculated nitrogen content.

*Example 2*

To a mixture of 153 grams (1 mole) of 2,5-dichlorothiophene and 214 grams (2 moles) of 95 per cent acetic anhydride heated to 60° C. were added 20 grams of 85 per cent orthophosphoric acid. The reaction mixture was maintained at 120° C. for two hours. Evolution of hydrogen chloride gas was noted and toward the end of the reaction period traces of hydrogen sulfide were evolved. After cooling the reaction product mixture, water was added and 120 grams of unreacted 2,5-dichlorothiophene were recovered by steam distillation. Upon cooling the remaining mixture, crystallization took place in the organic layer; the water layer was decanted and the resulting product freed of acetic acid by digesting with warm water. Twenty-nine grams of product were obtained, which, after recrystallizing from petroleum ether, melted at 46.5–47° C. A mixed melting point with an authentic sample of 2-acetyl-5-chlorothiophene showed no depression.

Analysis of the product indicated a chlorine content of 22.23 per cent and a sulfur content of 20.31 per cent. The calculated chlorine and sulfur contents for 2-acetyl-5-chlorothiophene were 22.17 and 19.93 per cent respectively. The oxime of the product was prepared by standard procedures and melted at 159.5–160.5° C.

We claim:

1. A process for converting a dichlorothiophene by nuclear acylation thereof into an acyl monochlorothiophene comprising reacting said dichlorothiophene with an acylating agent in the presence of phosphoric acid.

2. A process for converting a mixture of mono- and dichlorothiophenes by nuclear acylation thereof into an acylation product consisting of an acyl monochlorothiophene comprising reacting said mixture with an acylating agent in the presence of phosphoric acid.

3. A process for converting a dichlorothiophene by nuclear acylation thereof into an acyl monochlorothiophene comprising reacting said dichlorothiophene with an acylating agent in the presence of between about 0.1 and about 8 per cent by weight of phosphoric acid.

4. A process for converting a mixture of mono- and dichlorothiophenes by nuclear acylation thereof into an acylation product consisting of an acyl monochlorothiophene comprising reacting said mixture with an acylating agent in the presence of about 0.1 to about 8 per cent by weight of phosphoric acid.

5. A process for converting a dichlorothiophene by nuclear acylation thereof into an acyl monochlorothiophene comprising reacting said dichlorothiophene with a carboxylic acid anhydride in the presence of phosphoric acid.

6. A process for converting a dichlorothiophene by nuclear acylation thereof into an acyl monochlorothiophene comprising reacting said dichlorothiophene with an acyl halide in the presence of phosphoric acid.

7. A process for converting a dichlorothiophene by nuclear acylation thereof into an acetyl monochlorothiophene comprising reacting said dichlorothiophene with acetic anhydride in the presence of phosphoric acid.

HOWARD D. HARTOUGH.
ALVIN I. KOSAK.

REFERENCES CITED

The following references are of record in the file of this patent:

Berkman, "Catalysis," pages 657, 658. Excerpt on Condensation. Reinhold Pub. Co., 1940.

Fieser and Fieser, "Organic Chemistry," page 536. Heath, 1944.

Thomas, "Anhydrous Aluminum Chloride in Organic Chemistry," page 373. Reinhold Pub. Co., 1941.